United States Patent [19]
Nakao

[11] Patent Number: 4,692,795
[45] Date of Patent: Sep. 8, 1987

[54] COLOR IMAGE READOUT DEVICE WITH DETACHABLE LIGHT SOURCE UNIT

[75] Inventor: Motokazu Nakao, Sakurai, Japan

[73] Assignee: Sharp Kabushiki Kaisha, Osaka, Japan

[21] Appl. No.: 797,893

[22] Filed: Nov. 14, 1985

[30] Foreign Application Priority Data

Dec. 17, 1984 [JP] Japan ............................ 59-191535[U]

[51] Int. Cl.⁴ ........................ H04N 1/028; H04N 1/46
[52] U.S. Cl. .................................... 358/75; 358/294; 362/226; 362/231; 362/238; 362/240; 362/260
[58] Field of Search ....................... 358/75, 293, 294; 250/578; 362/226, 231, 238, 240, 260

[56] References Cited

U.S. PATENT DOCUMENTS 4,318,122  3/1982  White ................................... 358/75
4,345,277  8/1982  Ishikawa ............................. 358/293

Primary Examiner—Howard W. Britton
Attorney, Agent, or Firm—Birch, Stewart, Kolasch & Birch

[57] ABSTRACT

In a color image readout device having a plurality of light sources of different color emissions, controlled to light sequentially so that light reflected from a document irradiated by the light sources is fed to a CCD sensor to obtain a color separation signal, the plurality of light sources are arranged on a single light source support to form a single unit.

6 Claims, 5 Drawing Figures

COLOR IMAGE READOUT DEVICE WITH DETACHABLE LIGHT SOURCE UNIT

BACKGROUND OF THE INVENTION

The present invention relates to a color image readout device used in color facsimile or color copying machines more specifically, to a device which optically scans a color document to separate its picture element into red, green and blue colors, photoelectrically converting them into color signals before ouput. The invention also relates to a light source unit in a color image readout device.

In a conventional color image readout device, three fluorescent lamps (Light sources), red (R), green (G) and blue (B), are flashed sequentially to obtain a color separation signal, which is then output by a single CCD sensor. Since fluorescent lamp flux gradually reduces with time, fluorescent lamp replacement is occasionally required. In a conventional color image readout device, however, replacement is not easy and fluorescent lamps are often installed incorrectly. For example, in a conventional device, fluorescent lamps of R, G and B are replaced individually. Therefore, the relative flux of each lamp may vary due to incorrect installation or different replacement times.

SUMMARY OF THE INVENTION

One object of the present invention is to provide a color image readout device whose fluorescent lamps, R, G and B, are easily replaced without changing the relative flux of the fluorescent lamps and without increasing the cost of replacement parts.

Another object of the present invention is to provide a light source unit with three fluorescent lamps, R, G and B, which is easily detached from a light source section for replacement.

Other objects and the further scope of applicability of the present invention will become apparent from the detailed description given hereinafter. It should be understood, however, that the detailed description and specific examples, while indicating preferred embodiments of the invention, are given by way of illustration only, and that various changes and modifications within the spirit and scope of the invention will become apparent to those skilled in the art from this detailed description. To achieve the above objects, according to an embodiment of the present invention, a color image readout device comprises a plurality of light sources of different color emissions, control means for sequentially actuating the plurality of light sources, means for receiving light reflected from a document irradiated by the light sources and outputting a color separation signal, and means for integrally supporting the plurality of light sources.

BRIEF DESCRIPTION OF THE DRAWINGS

The present invention will become more fully understood from the detailed description and accompanying drawings given hereinafter, which are given by way of illustration only and thus are not limitative of the present invention and wherein.

DETAILED DESCRIPTION OF THE INVENTION

Figure 1:
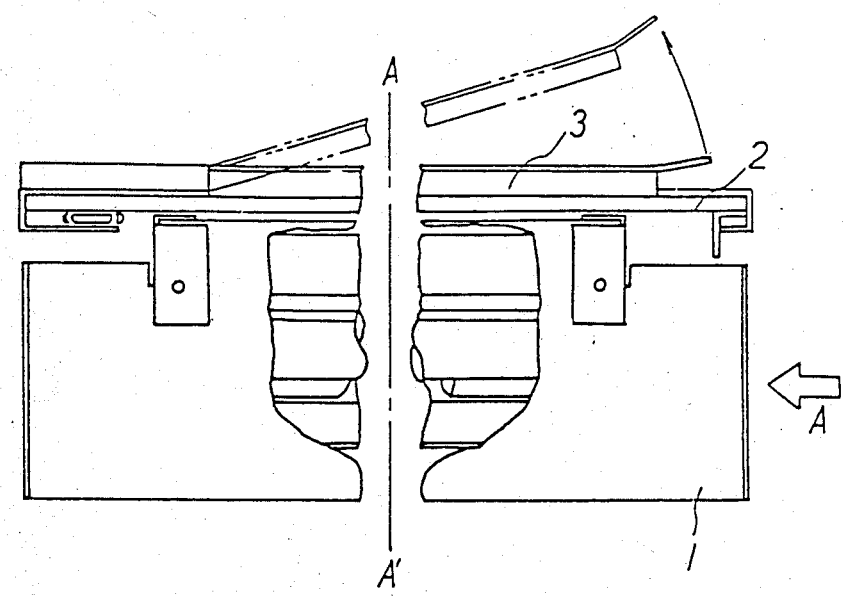
FIG. 1 is a side view of an embodiment of a color image readout device of the present invention.
Figure 2:
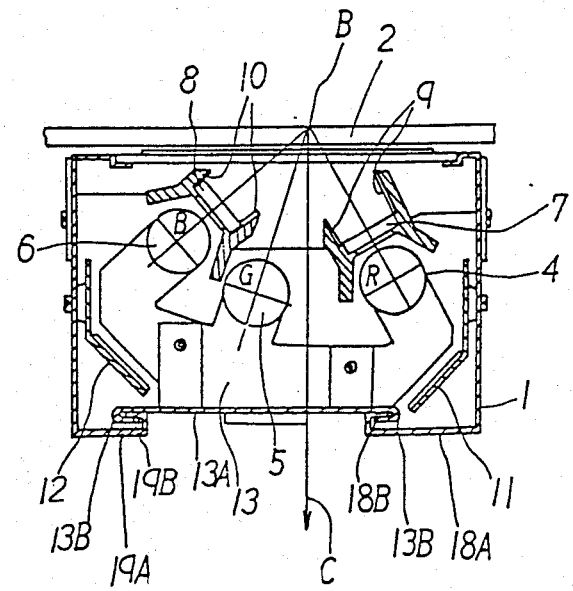
FIG. 2 is a sectional view of the color image readout device of FIG. 1 along the line A—A'.

FIG. 1 is a side view of a color image readout device of the present invention, focusing on the light source section; FIG. 2 is a sectional view thereof along the A—A' line of FIG. 1.

Referring to these figures, there is provided a main body 1 accomodating the light source section, a manuscript rest 2 composed of a glass plate, and a manuscript holder 3 on the manuscript rest 2. The manuscript holder 3 can be opened and closed.

The manuscript rest 2 is moved via drive equipment (not shown) in the lateral direction as viewed from the front of the device as indicated by the arrow A.

A document placed on the manuscript rest 2 is moved over a reading line (indicated by B in FIG. 2) as the manuscript rest 2 moves and is scanned sequentially by fluorescent lamps 4(R), 5(G), and 6(B), respectively, as described more fully hereinbelow.

As is clear from FIG. 2, the light source section in the main body 1 contains not only the three fluorescent lamps 4, 5 and 6 but also filters 7 and 8, installed for lamps 4 and 6 respectively, to provide the optimum spectral distribution characteristic for color separation. Reflecting mirrors 9 and 10 are added to increase the flux from lamps 4 and 6, respectively. The flux of lamps 4, 5 and 6 varies extensively depending on ambient temperature. A temperature detection sensor (not shown) and heaters 11 and 12, controlled according to information from the sensor, are installed within the main body 1 for optimum control of the ambient temperature lamps 4, 5 and 6.

The three fluorescent lamps 4, 5 and 6 are all arranged to irradiate an identical amount at readout line B of a manuscript. Reflected light C from the manuscript is collected by a readout sensor (for example, a CCD sensor) as the manuscript reading signal. Specifically, lamps 4, 5 and 6 are actuated to flash in turn; each flash produces an optical image of the manuscript on the CCD sensor which is photoelectrically converted to enable color information of the manuscript to be read.

Fluorescent lamps 4, 5 and 6 are mounted on a light source support frame 13, and installed by sliding it into the main body 1, making the three lamps together with the frame a light source unit.

Figure 3:
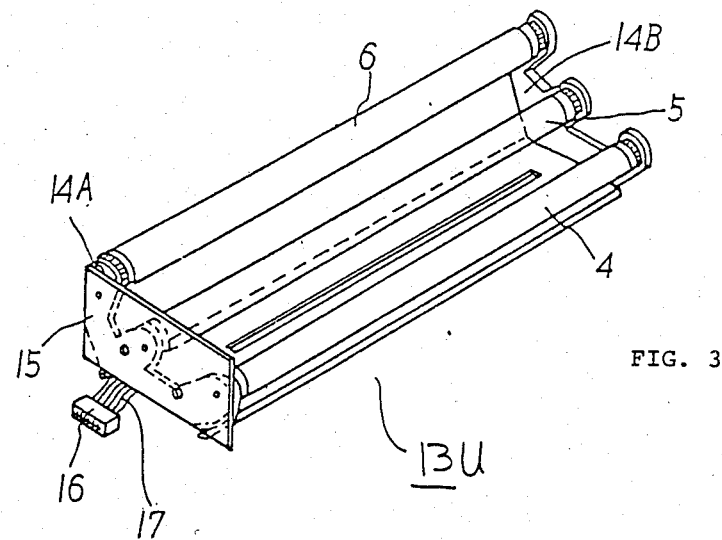
FIG. 3 is a perspective view showing the construction of an embodiment of a light source unit for a color image readout device of the present invention.

FIG. 3 shows the light source support 13U including the fluorescent lamps 4, 5 and 6. The light source support unit 13U is mainly composed of a frame 13 including a bottom plate 13A with supporting arms 14A and 14B at each end, each with sockets for electrical and mechanical connection and support of the lamps 4, 5 and 6. A front cover 15 is provided at the support arm 14A.

The three fluorescent lamps 4, 5 and 6 are supported by the pair of support arms 14A and 14B by insertion into the appropriate sockets. Thus each fluorescent lamp is located in its proper position for reading line irradiation. Electric cord 17, with connector 16 at the end, connects lamps 4, 5 and 6 with a power source.

The side edge portions of the bottom plate 13A of the light source support frame 13 are bent downward to define curled portions 13B. Guide plates 18A and 19A are longitudinally provided in the main body 1. Curled portions 13B are engaged with horizontal bent portions 18B and 19B of the guide plates 18A and 19A, making the entire light source support 13U slidable toward the front of the main body 1, with the curled portions 13B of the bottom plate 13A guided by guide plates 18A and 19A. Accordingly, the light source support unit 13U can be individually removed from the main body 1 (See FIG. 2).

According to the present invention, therefore, light source support unit 13U containing the fluorescent lamps 4, 5 and 6 can be easily removed from the light source section of the main body 1 for replacement. The present invention therefore eliminates the possibility of incorrect insertion of fluorescent lamps 4(R), 5(G) and 6(B) and relative accompanying flux changes. In addition, replacement is inexpensive due to the minimized number of replacement parts.

Figure 4:
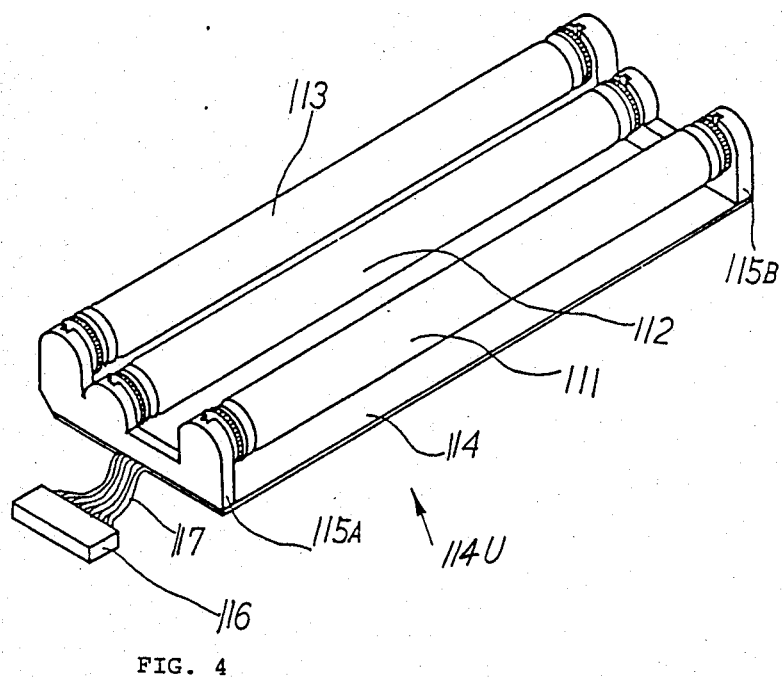
FIG. 4 is a perspective view showing the construction of a second embodiment of a light source unit of the present invention.

A second embodiment of a light source unit of the present invention will be described with reference to FIG. 4.

The light source unit 114U comprises R, G and B fluorescent lamps 111, 112 and 113, a frame 114 to support them, and a pair of socket portions 115A and 115B provided on both ends of the frame 114. Both socket portions 115A and 115B contain three sockets for electrical and mechanical connection and support of the lamps 111(R), 112(G) and 113(B). The bases 111A, 112A and 113A on both ends of the lamps 111, 112 and 113 have pins. The lamps are supported by the socket portions 115A and 115B by inserting these pins into the appropriate sockets for proper lamp positioning and leading line irradiation. An electric cord 117, with a connector 116 on the end, connects the fluorescent lamps 111, 112 and 113 with a power source.

To replace lamps 111, 112 and 113, therefore, the light source unit supporting them and specifically the frame portion is removed from the light source section of the device and replaced.

Figure 5:
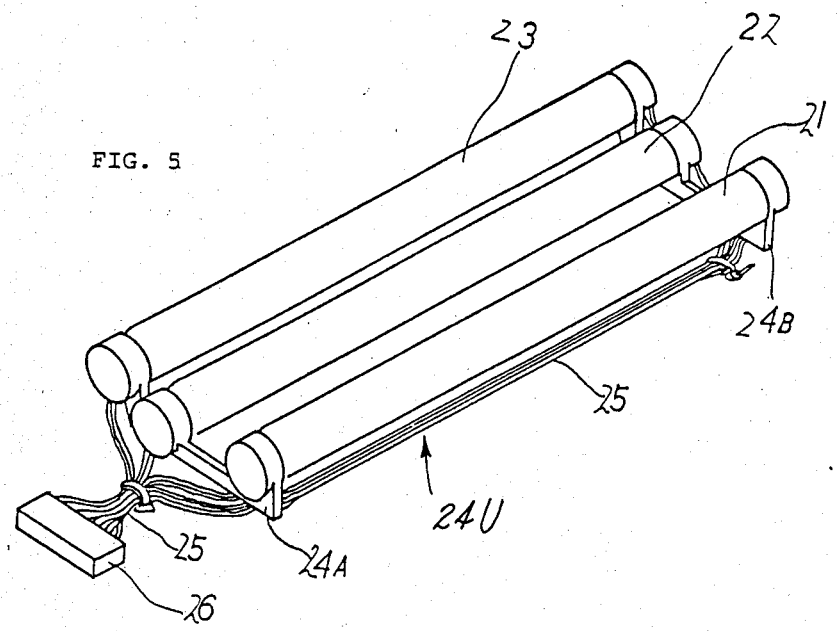
FIG. 5 is a perspective view of a third embodiment of a light source unit of the present invention.

FIG. 5 shows a third embodiment of a light source unit of the present invention. According to this embodiment, a pair of base members 24A and 24B are provided integrally with both ends of three R, G and B fluorescent lamps 21(R), 22(G) and 23(B); the lamps and base members together constitute a light source unit 24U.

Base members 24A and 24B are made of an insulating material, such as molded resin, and formed into one integral body. Lead wires 25 extend from each end of the fluorescent lamps 21, 22 and 23 and are connected to connector 26.

As understood from the above, according to this embodiment of the invention, bases on the ends of each of the lamps 21, 22 and 23 are of a molded insulating material; as such they form a pair of base members, thereby interconnecting the lamps to define a light source unit 24U. When assembling, insertion of fluorescent lamps into sockets is not necessary. That is, incorrect insertion of a fluorescent lamp can never occur in this embodiment. Moreover, this light source unit does not involve socket members, making the unit shorter and reducing the number of replacement parts. As a result, the cost is reduced.

Thus, the present invention provides the practical advantages of easy R, G and B fluorescent lamp replacement, no relative flux change of the fluorescent lamps, and minimal number of replacement parts. These advantages contribute to cost reduction.

While only certain embodiments of the present invention have been described, it will be apparent to those skilled in the art that various changes and modifications may be made therein without departing from the spirit and scope of the present invention as claimed.

What is claimed is:

1. A color image readout device comprising:
    a main body,
    a light source support unit housed in said main body, said light source support unit comprising a plurality of light sources of different color emissions and means for integrally supporting said plurality of light sources,
    means for sequentially actuating said plurality of light sources, and
    means for receiving light reflected from a document irradiated by said light sources and outputting a color separation signal.

2. The color image readout device of claim 1, wherein said light source support unit comprises a plurality of light sources consisting of red, green and blue fluorescent lamps supported by a pair of support arms with corresponding sockets for each of said fluorescent lamps.

3. The color image readout device of claim 2, wherein each of said support arms consists of an integral body of insulating material formed on ends of each of said lamps, said support arms and lamps forming an integrated light unit.

4. A light source support unit for a color image readout device having a plurality of light sources of different color emissions, controlled so as to be actuated sequentially so that light reflected from a document irradiated by said light sources is directed to a means for outputting a color separation signal, said light source support unit comprising:
    a plurality of light sources of different color emissions; and
    means for integrally supporting said plurality of light sources.

5. The light source support unit of claim 4, wherein said plurality of light sources consist of red, green and blue fluorescent lamps, and said lamps are supported by a pair of support arms with corresponding sockets for each of said fluorescent lamps.

6. The light source support unit of claim 5, wherein each of said support arms is an integral body of insulating material joined on respective ends of said fluorescent lamps so as to form an integrated light unit.

* * * * *